UNITED STATES PATENT OFFICE.

LUCIEN LOUIS BÉTHISY, OF VILLENEUVE-LA-GARENNE, FRANCE.

MANUFACTURE OF NON-INFLAMMABLE CELLULOID.

No. 894,108.      Specification of Letters Patent.      Patented July 21, 1908.

Application filed May 4, 1907. Serial No. 371,920.

*To all whom it may concern:*

Be it known that I, LUCIEN LOUIS BÉTHISY, a citizen of the Republic of France, and resident of Villeneuve-la-Garenne, France, have invented a new and useful Improvement in or Relating to the Manufacture of Non-Inflammable Celluloid, which improvement is fully set forth in the following specification.

This invention relates to the manufacture of a plastic mass containing nitrated cellulose (tetranitrocellulose) having the double feature of not containing any camphor and of being non-inflammable. It can be obtained in the form of blocks, plates, tubes, sticks, bars, filaments and even in the liquid state (collodion).

The product can be used for the manufacture of all kinds of articles, and may replace celluloid in all its applications, and be used as an insulating material. Its preparation is effected by means of a series of operations which will be successively described in detail.

(*a*) Transformation of cellulose into tetranitrocellulose: (*b*) Crushing and bleaching of the tetranitrocellulose: (*c*) Grinding and mixing of the tetranitro cellulose with addition of supplementary substances: (*d*) Conversion of the mixture into a paste with addition of other supplementary substances: (*e*) Solidification of the paste by adding to it other supplementary substances: (*f*) Compression of the plastic mass thus obtained: (*g*) Cutting and drying of the compressed mass.

A. *Nitration of cellulose.*—Nitric acid and sulfuric acid are poured into a vessel in the proportion of 24 kilograms of nitric acid at 42° to 56 kilograms of sulfuric acid at 66°. As this mixture brings about a great rise of temperature, the vessels must be placed in a current of cold water. They are covered and left to stand until the temperature sinks to 30° C. Then cellulose is added to the above mixture of acids in the proportion of 5 to 6 kilograms. After coming in contact with the mixed acids, the cellulose is converted into tetranitrocellulose, which is withdrawn from the vessel. It is drained and placed in a hydro-extractor for removing the liquid acid still adhering to it. Then it is passed through a rotary stirring device and then into a tank where it is submitted to the action of an energetic current of water.

B. *Breaking up and bleaching.*—The tetranitrocellulose is then introduced into a paper or rag engine or the like, and gradually reduced to fine fragments. The mass is bleached in any well known manner. The paste is then mechanically brought into draining devices on which it is allowed to rest. Having thus been freed from the largest portion of its excess of water, the paste is placed in a hydro-extractor to deprive it of all but 40–45% of its water contents.

C. *Grinding.*—The tetranitrocellulose thus containing 40–45% of water is introduced into "nut" grinding mills with successive "falls"; at the first "fall" the nitrocellulose is reduced to pulp. Then about 5% by weight of a liquid hydrocarbon, preferably of essential oil of aspic or its chemical substitute, is added to it. At the third fall suitable coloring substances are added to the mass in order to obtain the desired color.

D. *Conversion into paste.*—The tetranitrocellulose having been ground with 40–45% of water, the water is then removed by pressing the mass into thin cakes in a hydraulic press. These cakes are then crushed into very fine pieces and moistened with a solvent of the following composition:—

| | | |
|---|---|---|
| Crystallizable acetic acid | 0.800 | kgs. |
| Sulfuric ether at 65° | 20 | " |
| Acetone | 20 | " |
| Amyl acetate | 15. | " |
| Alcohol | 15. | " |
| Solution of *Unona selanica* at 10% | 8.200 | " |

The above proportions correspond to the moistening of 100 kilograms of crushed cakes. For preparing the solvent in question, the operation is as follows:—0.850 kilograms of *Unona selanica* are dissolved in 7.750 kilograms of sulfuric ether at 65°; and the mixture is stirred from time to time during 24 hours and then filtered. The ether, acetic acid and acetone are mixed together, then after having stirred this mixture from time to time for a period of 12 hours, the solution of *Unona selanica* and sulfuric acid, prepared separately, is added to it. Then the process is as follows:—The whole of the amyl acetate is poured into a vat, whereupon the pulverized pulp is added to it. The whole is left to stand for about 6 hours, and then stirred. The preparation of *Unona selanica*, sulfuric ether, acetic acid and acetone, previously prepared, is then added and the whole is again left to stand for about 6 hours and then stirred. Finally, the whole of the alcohol is poured in. The whole is introduced into a stirring device, and a paste is obtained which is left to stand for at least 24 hours in a very warm place.

*E. Solidification.*—The paste is then cut up and rolled between two cylinders heated to about 60° and it gradually becomes consistent. When it has reached a suitable degree of consistency, the cylinders of the rolling apparatus are cooled and the following substance poured on the paste:—

1. Boracic acid by weight ___ 50 parts.
   Sulfuric acid by weight ___ 10 parts.
   Calcic alcoholate at 75% by weight ___ 100 parts.
2. Sulfocyanid of ammonium by weight ___ 40 parts.

This solution is prepared as follows: Ether is poured on boracic acid in order to obtain the reaction of a strong on a weak acid, then calcic alcoholate is added. The whole is left to rest for about 24 hours, stirring from time to time, then it is filtered (one kilogram of the mixture giving about 0.565 kilogram of filtered solution). The calcic alcoholate thus prepared gives an ethoxyl derivative of tetranitrocellulose which is tetranitro-oxycellulose. By the addition of sulfocyanid of ammonium, the acids are neutralized, without in any way affecting the quality of the substance. After the addition of the said mixture, the rolling is continued until complete and thorough incorporation is made. The plastic rolled product is then removed from the rolling mill in the shape of more or less thick sheets, and inclosed into a well closed vessel. The product prepared in the manner hereinbefore described is celluloid without camphor, and uninflammable.

*F. Compression.*—The substance thus prepared contains gas bubbles which must be expelled, so as not to have any empty space between the molecules of the substance. This result is obtained by superposing the sheets obtained in a steam box mounted on a hydraulic press. When the box is charged, the pressure is caused to increase, and when the latter remains fixed at 150 atmospheres, it is heated by steam to about 90° for about 5 to 6 hours. Perfectly homogeneous plates without any faults are thus obtained. While they are still in the state of a paste, the pressure is raised to two hundred atmospheres, and at the same time the steam current is replaced by an energetic current of water as cold as possible which is caused to act for several hours: and under the action of cold the material becomes very hard.

*G. Cutting and drying.*—The blocks thus obtained are cut up into sheets and placed in a drying kiln or otherwise dried. If it is desired to convert the plastic product into tubes, rods, bars, or filaments, it is introduced, on leaving the rolling mill, into a pressing apparatus provided with suitable draw-plates or the like.

Claims.

A plastic material obtained by the action of a hydrocarbon (preferably essential oil of aspic or its chemical substitute) on tetranitrocellulose, the mass being subsequently subjected to the action of a mixture of sulfuric acid, ether, acetone, acetate of amyl, alcohol and a solution of *Unona selanica*.

In testimony whereof I have signed this specification in the presence of two subscribing witnesses.

LUCIEN LOUIS BÉTHISY.

Witnesses:
  EMILE LEDRET,
  HANSON C. COXE.